(12) United States Patent
Merritt

(10) Patent No.: US 7,511,767 B2
(45) Date of Patent: Mar. 31, 2009

(54) VIDEO STORAGE DEVICE, AND METHOD OF CONTROLLING A VIDEO STORAGE DEVICE AND VIDEO MIXER

(75) Inventor: Richard William Norman Merritt, Cambridge (GB)

(73) Assignee: Snell & Wilcox Limited, Hampshire (GB)

( * ) Notice: Subject to any disclaimer, the term of this patent is extended or adjusted under 35 U.S.C. 154(b) by 477 days.

(21) Appl. No.: 11/091,345

(22) Filed: Mar. 29, 2005

(65) Prior Publication Data

US 2006/0227248 A1 Oct. 12, 2006

(51) Int. Cl.
*H04N 9/76* (2006.01)
*H04N 9/74* (2006.01)

(52) U.S. Cl. .................. 348/598; 348/584; 348/591; 348/578; 348/722; 348/715

(58) Field of Classification Search ............. 348/584, 348/591, 598, 578, 585, 588, 722, 600, 714, 348/715, 589
See application file for complete search history.

(56) References Cited

U.S. PATENT DOCUMENTS

| | | | | | |
|---|---|---|---|---|---|
| 4,172,264 | A | * | 10/1979 | Taylor et al. ............. | 348/722 |
| 5,115,314 | A | * | 5/1992 | Ross et al. ............... | 348/596 |
| 5,194,952 | A | * | 3/1993 | Pelley ..................... | 348/594 |
| 5,227,863 | A | * | 7/1993 | Bilbrey et al. ............ | 348/578 |
| 5,559,641 | A | * | 9/1996 | Kajimoto et al. .......... | 386/56 |
| 5,649,171 | A | * | 7/1997 | Craven et al. ............. | 703/23 |
| 5,684,543 | A | * | 11/1997 | Kobayashi ............... | 348/705 |
| 5,852,438 | A | * | 12/1998 | Tomizawa et al. ......... | 715/738 |
| 5,889,949 | A | * | 3/1999 | Charles ................... | 709/214 |
| 5,914,757 | A | * | 6/1999 | Dean et al. ............... | 348/584 |
| 5,923,385 | A | * | 7/1999 | Mills et al. ............... | 348/715 |
| 5,926,603 | A | * | 7/1999 | Tanaka et al. ............ | 386/53 |
| 5,953,691 | A | * | 9/1999 | Mills ...................... | 702/198 |
| 5,982,456 | A | * | 11/1999 | Smith et al. .............. | 348/722 |
| 6,198,477 | B1 | * | 3/2001 | Kurtze et al. ............. | 715/500.1 |
| 6,356,314 | B1 | * | 3/2002 | Takebe ................... | 348/564 |
| 6,437,831 | B1 | * | 8/2002 | Windrem ................. | 348/578 |
| 6,606,127 | B1 | * | 8/2003 | Fang et al. ............... | 348/500 |
| 6,642,939 | B1 | * | 11/2003 | Vallone et al. ............ | 715/721 |
| 6,674,955 | B2 | * | 1/2004 | Matsui et al. ............. | 386/52 |
| 6,744,968 | B1 | * | 6/2004 | Imai et al. ................ | 386/52 |
| 7,024,677 | B1 | * | 4/2006 | Snyder et al. ............. | 725/86 |
| 7,206,809 | B2 | * | 4/2007 | Ludwig et al. ............ | 709/204 |
| 7,207,007 | B2 | * | 4/2007 | Moriwake et al. ......... | 715/723 |
| 2006/0059426 | A1 | * | 3/2006 | Ogikubo .................. | 715/723 |
| 2007/0098354 | A1 | * | 5/2007 | Ando et al. ............... | 386/46 |

* cited by examiner

*Primary Examiner*—David L Ometz
*Assistant Examiner*—Jean W Désir
(74) *Attorney, Agent, or Firm*—Pearl Cohen Zedek Latzer, LLP

(57) ABSTRACT

A video mixer may be employed to form a transition between two video compositions, for example a fade or a wipe. A video storage device may be associated with the video mixer and plays out a video signal, the timing of which is controlled in dependence upon the progress of the transition made by the said video mixer.

12 Claims, 2 Drawing Sheets

Video Mixer System

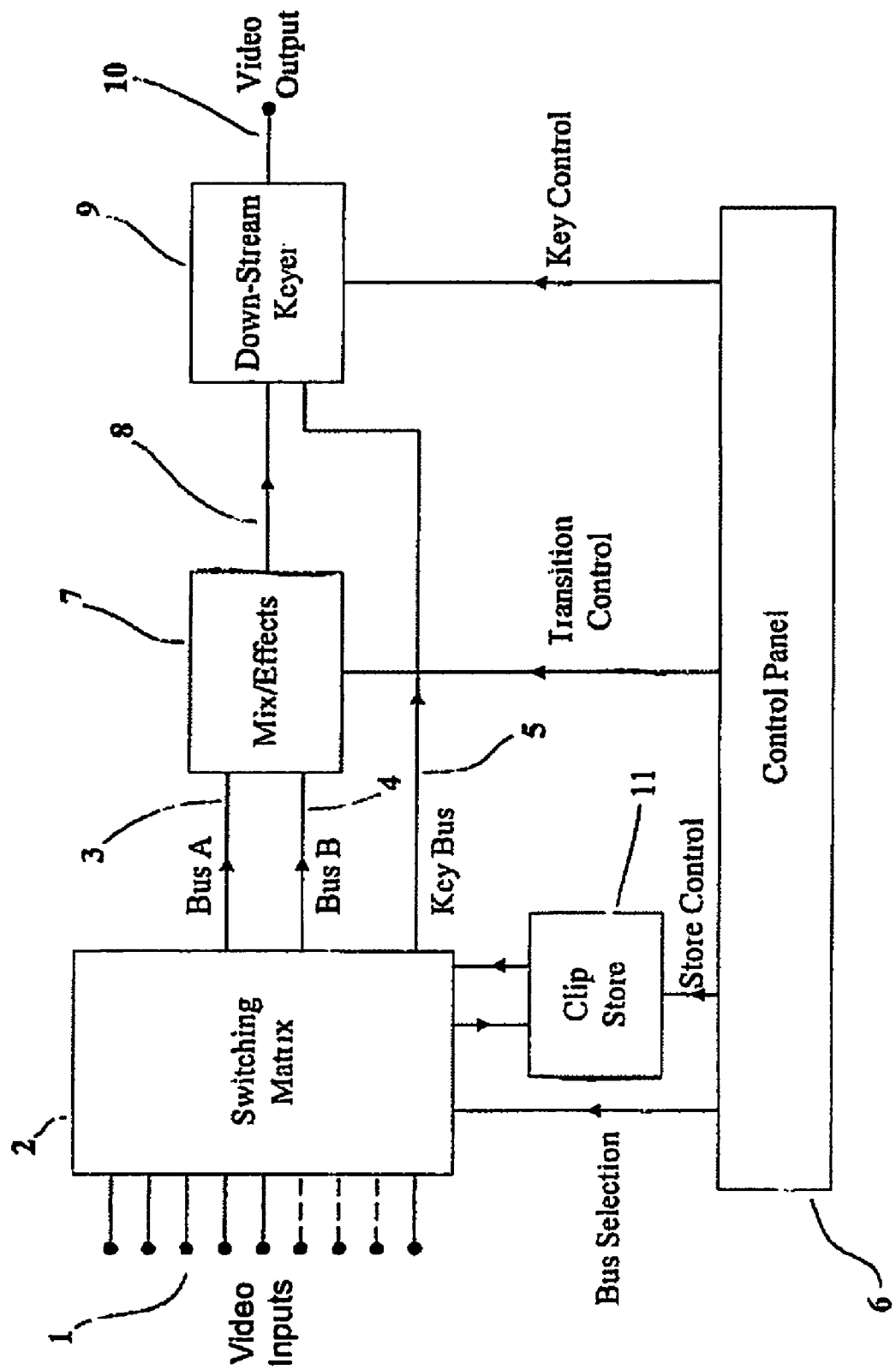
Figure 1: Video Mixer System

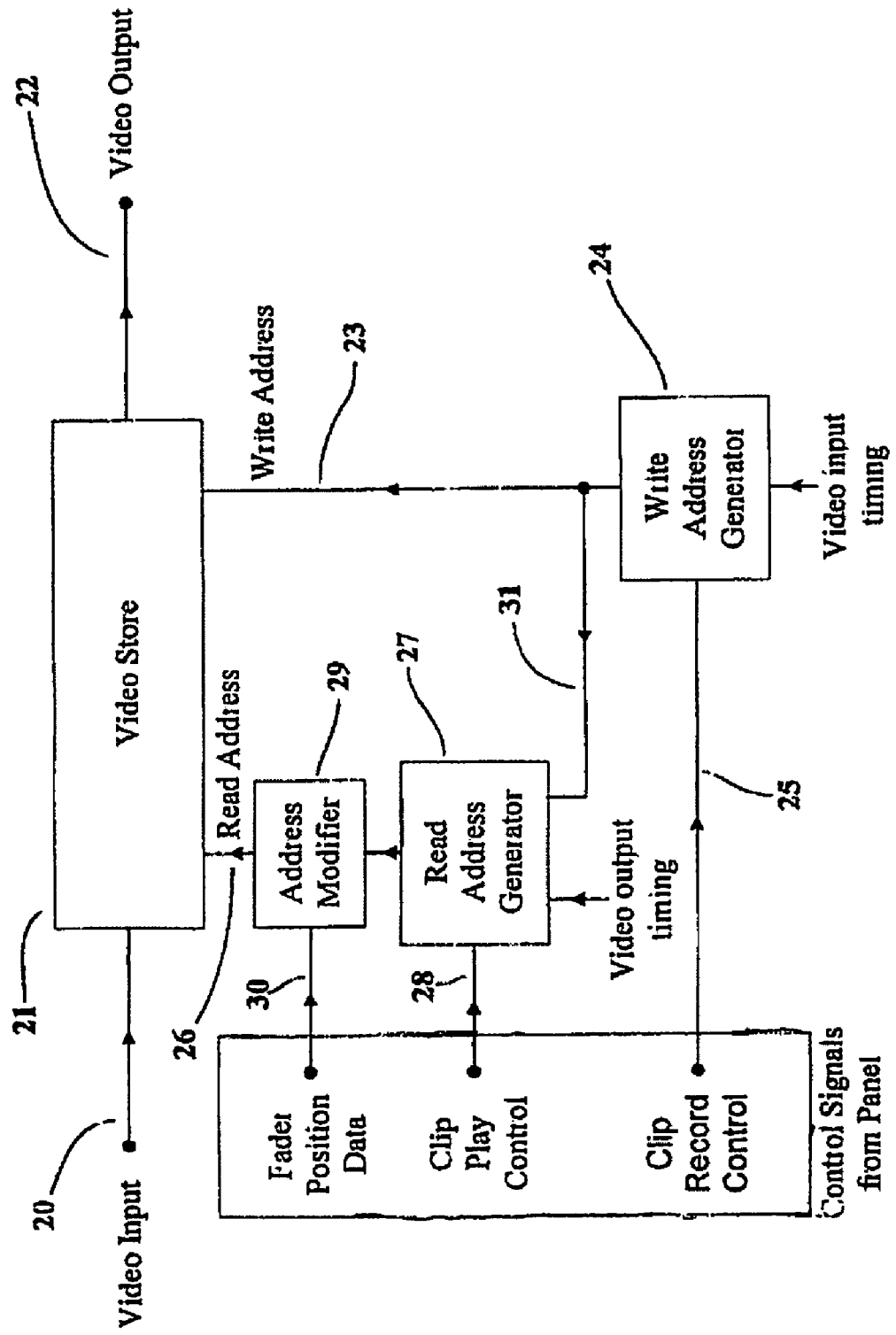
Figure 2: Video Storage System

VIDEO STORAGE DEVICE, AND METHOD OF CONTROLLING A VIDEO STORAGE DEVICE AND VIDEO MIXER

FIELD OF THE INVENTION

This invention concerns the control of a video storage device associated with a video mixer.

BACKGROUND OF THE INVENTION

Video mixers, known also as production switchers, are used for combining and manipulating video signals from a number of video sources to form one or more output video signals comprising selections from, and combinations of, the video inputs. In live production the mixer operator controls the transition from one shot to the next; facilities for the combination and selection of audio signals may also be provided in the same equipment.

Typically an operator is able to select a video signal by pressing one of a row of push buttons, known as a "bus". Mixers usually have between two and eight such busses grouped in pairs, which are associated with a particular video output. This output consists of one of the bus selections, or a combination of the selections from the two paired busses. The operator typically changes the output from one bus to the other, and thus the output picture from one picture to another picture, by moving a fader handle, often known as a T-Bar. The transition may be, for example, a cross-fade, or a wipe. In a cross-fade, the proportions of the two bus signals depend on the position of the fader. In a wipe both signals are present at full amplitude in the output but a variable portion of one picture is removed to reveal the other picture. The shape of the revealed portion is pre-determined by the operator and the relative areas of the output picture contributed by the respective input pictures depend on the position of the fader.

Other types of combination of, and transition between, pairs of busses are known and these may involve the use of signals from other busses to modify the transition or combination. A common method of combining pictures is the technique of "keying" in which the brightness or colour of a part of a picture is used to control the substitution of that part of that ("foreground") picture for the equivalent part of another ("background") picture. Alternatively the controlling, or key, signal may be a third signal different from (but usually related to) the foreground or the background.

Video mixers may not necessarily be controlled directly by an operator. Semi-automatic systems exist in which the operator initiates a video transition from one shot to another (e.g. between one bus and another), but the type of transition and the length of time needed for the transition to occur have been pre-programmed. Similarly, fully automatic systems are known in which all aspects of the video transitions are under the control of an automation system.

It is well-known to include a video store in a video mixer system, for example a solid state memory device holding one or more frames of video. If several frames can be stored, it is then possible for a dynamic video sequence to be played in response to an action by the operator, such a sequence is often referred to a "clip" by analogy with a short length of film.

Typically the sequence may be started when the operator moves the fader handle to initiate a transition from one video source to another. For example, as the edge of a wipe transition passes across the output picture, a moving logo, played from a store, may be keyed over the wipe.

Although it is possible to initiate the playing of the clip of the logo from the start of the fader movement controlling the wipe transition, the progress of the logo is determined by its original recording, whereas the progress of the wipe transition is controlled by the operator. The operator may wish to modify the progress of the wipe transition in real time in response to the video content, which may be live and therefore unpredictable.

SUMMARY OF THE INVENTION

The inventor has appreciated that it may be helpful to associate the timing of playout of a stored video sequence with the progress of a transition from one output picture to another.

The invention consists, in a first aspect, of a method of controlling a video storage device associated with a video mixer in which the timing of playout of a video signal from the video storage device is varied in dependence upon the progress of a transition made by the said video mixer between two video compositions.

Suitably, the said transition is controlled by an operator's movement of a control actuator that simultaneously controls the said transition and the timing of playout of a replayed video signal from the said video storage device.

Advantageously, the read or write address of said video storage device is varied in dependence on the progress of the said transition.

In a further embodiment, one of a plurality of stored frames is selected for whole or partial output from said mixer, the said selection being controlled by the progress of said video transition.

In a second aspect the invention consists of a method of keying a first video signal into a second video signal using a key signal, in which the key signal is replayed from a video store, wherein the timing of playout of the replayed key signal from the said store is varied in dependence upon the progress of a transition in the second video signal made by an associated video mixer between two video compositions.

Advantageously the said transition is controlled by an operator's movement of a control actuator that simultaneously controls the said transition and the time sequence of the replayed key signal from the said video store.

In a yet further aspect one of a plurality of stored frames is selected as the said key signal, the said selection being controlled by the progress said video transition.

In a third aspect the invention consists of a method of controlling a video storage device associated with a video mixer comprising the steps: receiving control signal information indicating progress of a transition made by the said video mixer between two video compositions, and generating a read address for reading video data from the video storage device for supply to the video mixer, the read address being generated at least in part in dependence upon the control signal information.

Advantageously the step of generating a read address for reading video data comprises the steps of: generating a start address of the first frame of a sequence of frames; and incrementing the start address in proportion to the product of the sequence length and the progress of the video mixer transition to generate the read address.

In one embodiment, the step of generating a read address comprises the step of generating a read address in accordance with the equation:

Read Address=Start Address+Rounded value of (Transition Position×Clip Length)

wherein the clip length is expressed in frames; the transition position is zero at the start of the transition and one at the end of the transition In a fourth aspect the invention consists of a video storage device for a video mixer, comprising a video store, for storing video data therein; control input for receiving control signal information indicating progress of a transition made by the said video mixer between two video compositions, and an address generator for generating a read address for reading video data from the video store for supply to the video mixer, the read address being generated at least in part in dependence upon the control signal information.

Advantageously the address generator comprises: an initial address generator for generating the start address of the first frame of a sequence of frames an address modifier for incrementing the start address from the initial address generator in proportion to the product of the sequence length and the progress of the video mixer transition to generate the read address.

In one embodiment the address modifier generates a read address in accordance with the equation:

Read Address=Start Address+Rounded value of (Transition Position×Clip Length)

wherein the clip length is expressed in frames; the transition position is zero at the start of the transition and one at the end of the transition.

In a fifth aspect the invention consists of a video mixer comprising: a video storage device according to the invention, and an operator-controlled control actuator for controlling a transition made by the video mixer between two video compositions and the timing of playout of a replayed video signal from the video storage device.

BRIEF DESCRIPTION OF THE DRAWINGS

For a better understanding of the present invention, and to show how it may be brought into effect, reference will now be made, by way of example, to the accompanying drawings, in which:

FIG. 1 shows a video mixer system; and

FIG. 2 shows video clip storage system according to an embodiment of the invention.

DETAILED DESCRIPTION OF THE INVENTION

A video mixer system is shown in FIG. 1.

Input video signals (1) are input to a cross-point switching matrix (2), which provides three output video signals: Bus A (3), Bus B (4), and Key Bus (5). It will be apparent to a skilled person that, depending upon the desired video mixer output signal, a video signal might not be output on all output busses at all times.

In addition, in some embodiments the Key Bus (5) may comprise two signals: namely video data to be inserted into the picture area, and a key signal to define the part(s) of the picture area into which the data is to be inserted.

The signals to be output on the respective busses are chosen from the inputs (1) by the matrix (2) under the control of a control panel (6), for example by means of the illustrated bus selection control signal The control panel (6) may have, for example a row of buttons corresponding to each Bus.

The signals (3) and (4) are fed to a mix/effects unit (or M/E unit) (7), which forms an output video (8) by selecting or combining the signals (3) and (4). The choice between or combination of the signals (3) and (4) is controlled from the control panel (6) via the illustrated transition control signal, possibly by means of a operator actuated control such as a fader handle or T-Bar on the panel.

In some embodiments the M/E unit (7) may be able to carry out keying operations or other methods of combining pictures in dependence upon picture content, However, this embodiment has not been illustrated for clarity.

The combined video signal (8) is fed to a down-stream-keyer (or DSK) unit (9) which also receives the Key Bus video signal (5). Additional controls on the panel (8), for example the illustrated Key control signal, enable the operator to combine the Key Bus video signal (4) with the combined video signal (8) to give a final video output signal (10).

The skilled person will appreciate that the M/E unit (7) and the DSK unit (9) may operate simultaneously and that the picture composition at the output (10) may not be identical with any of the inputs (1) and need not necessarily contain information from any of these inputs. Therefore a transition between one output composition to another may not involve the simple replacement of one input video by another—a transition may involve changing the way input pictures and/or video generated or stored in the mixer system are combined or presented to a viewer.

The system also includes a clip-store (11) that can write one of the inputs (1) to the matrix (2) into its storage registers; and, read out its storage registers back to the matrix (1) In this way a short input video sequence could be stored and then subsequently played back to, for example, the key bus (5). It is also possible to store both a key and a foreground signal for simultaneous replay. It is also known for a clip store to have more than one output. For example, a separate key-signal output may be provided so that every output frame has a key-signal frame associated with it and the key-signal frame can be used to control the insertion of the clip-store output frame into a background signal.

A typical video transition required from such a system might be a wipe from one video source to another where a logo moves across the screen at the same time as the wipe transition crosses the screen. This would be achieved by setting the M/E block (7) to carry out the wipe; the moving logo would have been previously stored as a clip in the store (11). The operator would move the fader controlling the wipe and, at the same time, the logo clip would be played from the store (11) and keyed over the wipe by the DSK block (9).

The video storage system shown in FIG. 2 (which could be used as the clip-store (11) in FIG. 1) will now be described.

The invention will be described with reference to a sequence of video frames comprising a video clip. However, the invention is not intended to be limited to sequences of video frames, and may be applied to the timing or spatial position of the read out and display of a single video frame, and reference to video clips or clip storage below should be interpreted accordingly.

Video signal (20) is input to a store (21) that has a number of addressable locations into which video can be written, and from which video can be read. The video signal read from the store appears at the output (22).

The writing of video into the store is controlled by a write address (23) from a write address generator (24), which responds appropriately to control signals (25), for example a clip record control signal, from a control panel. It is convenient for the store to be organised by video frames so that an incoming frame can be directed to a particular store location and a complete frame can be output from a particular location. Ordered groups of locations can be assigned to clips comprising sequences of frames. The illustrated video input timing information, which may be separated from the video input (20), is used by the address generator (24) to ensure the correct relationship between the write address (23) and the timing of the store input (20).

Video can be written to the store either continuously or intermittently. In intermittent writing the write address generator (24) provides a finite sequence of frame addresses associated with particular video input frames. In continuous writing a finite sequence of frame addresses is repeated so that newly arriving input frames overwrite the oldest frames.

The store may be partitioned into a number of areas for different clips or stills, each having its own address or range of addresses.

Reading from the store is controlled by the read address (26) If a fixed address is supplied to the store (21) the frame at that location is output repetitively (i.e. a still picture is output). A clip can be replayed by supplying the relevant sequence of addresses. It is, of course, possible to play a clip repetitively by repeating the sequence of addresses.

The playing of a clip can be synchronised with a video transition as follows. A read address generator (27) receives a clip play control input (28) from the control panel (e.g. the block (6) of FIG. 1) to identify the clip to be played and it outputs the address of the first frame of the clip. This address is passed to an address modification block (29) that also receives fader position information (30) about the position of the fader on the mixer's control panel that will control the progress of a video transition.

As the fader is moved by the operator, the clip read address is incremented in proportion to the product of the clip length and the fader position, and the resulting sequence of addresses forms the read addresses (26) to the store (21) This can be expressed as follows:

Read Address=Start Address+Rounded value of
(Fader Position×Clip Length)

Where: the clip length is expressed in frames, and the fader position is zero at the start of its travel and one at the end of its travel.

The rounding ignores any fractional results from the multiplication so that the resulting address is always an integer.

Once the read address is sent to the store, the addressed frame is read out under the control of the illustrated video output timing signal. Once that frame has been played, the current value of the fader position data (30) is used to determine the next frame to be played.

The duration of the video transition in frames may be different from the number of frames comprising the clip. If the operator moves the fader slowly, some clip frames will be played more than once. If the operator moves the fader quickly, some frames may be omitted. If the operator, having started the transition by moving the fader forwards then moves the fader backwards, the clip will be played backwards. And, if the operator stops moving the fader part way through the transition the clip will "freeze" to a still frame.

Advantageously the operator provides information to the control system to determine what happens at the start and end of the transition. It will usually be convenient for the clip store (11) to output a black frame until the start of the transition. At the end of the transition (when the fader reaches the end of its travel) it may be appropriate to continue to output the final frame of the clip. Alternatively it may be preferable for the clip store output (22) to return to black, possibly fading to black over a user-defined time period.

It may be that only part of a clip is to be synchronised with -a transition; in this case the clip start address and clip length values used in calculating the read address (25) will need to be modified to select the correct part. Alternatively, more than one clip may need to be played in sequence, or a clip repeated, either forwards or backwards, in the course of the video transition. These effects can be achieved by creating a sequence of address modifications that can be performed by the block (29).

In a further embodiment the read address (26) may refer to individual pixels or lines of stored video, and the modifier (29) may modify the timing of the read-out of lines or pixels from the display so that the position of the stored information within the output picture (10) is varied in synchronism with the progress of a video transition under the control of the fader position data (30).

The read address generator (27) may operate in other, known, ways such as providing a read address which is derived from the write address (as shown by the connection (31)) so that the clip store operates as a variable video delay and the delay is modified by the block (29) in dependence on the progress of a video transition. It is also possible for the write address to be modified in dependence on the fader position whilst the read addresses remain unmodified.

The invention has been described by way of example and other variants within the inventive concept will be apparent to the skilled person. For example: the fractional part of the product of fader position and clip length could be used to control interpolation between stored frames; the sequence of the clip frames could be reversed; or, a non-linear relationship between the fader position and the store address could be used.

While the present invention has been described herein with reference to the illustrative embodiment, the skilled person will understand that various modifications may be made without departing from the inventive concepts defined in the appended claims.

The invention claimed is:

1. A method of video mixing in which a stored video signal representing a logo is played out over a transition from a first video composition to a second video composition comprising:
    forming using a video mixer a transition between the two video compositions, that transition having a duration;
    playing out at a video storage device associated with the video mixer a video signal from the video storage device, that video signal representing the logo and having a nominal playout length; and
    varying the timing of playout of the video signal from the video storage device in dependence upon the progress of the transition made by the video mixer between two video compositions so that the playout length of the video signal matches the duration of the transition.

2. The method according to claim 1 comprising controlling the transition by movement of a control actuator that simultaneously controls the said transition and the timing of playout of a replayed video signal from the said video storage device.

3. The method according to claim 1 comprising varying the read or write address of said video storage device in dependence on the progress of the said transition.

4. The method according to claim 1 comprising selecting one of a plurality of stored frames for whole or partial output from said mixer, the said selection being controlled by the progress of said video transition.

5. The method according to claim 1 comprising varying the time sequence of the replayed video signal from the video storage device in dependence upon the progress of the transition made by the said video mixer between two video compositions.

6. A method of controlling a video storage device associated with a video mixer comprising:

receiving control signal information indicating progress of a transition made by the said video mixer between two video compositions; and generating a read address for reading video data from the video storage device for supply to the video mixer, the read address being generated in dependence upon the control signal information, wherein the step of generating a read address for reading video data comprises generating a start address of the first frame of a sequence of frames; and incrementing the start address in proportion to the product of the sequence length and the progress of the video mixer transition to generate the read address.

7. A method of controlling a video storage device associated with a video mixer comprising:

receiving control signal information indicating progress of a transition made by the said video mixer between two video compositions; and generating a read address for reading video data from the video storage device for supply to the video mixer, the read address being generated in dependence upon the control signal information, wherein the step of generating a read address comprises the step of generating a read address in accordance with the equation:

Read Address=Start Address+Rounded value of (Transition Position×Clip Length)

wherein the clip length is expressed in frames; the transition position is zero at the start of the transition and one at the end of the transition.

8. A video storage device for a video mixer, the device comprising:

a video store, for storing video data therein;

control input for receiving control signal information indicating progress of a transition made by the said video mixer between two video compositions; and an address generator for generating a read address for reading video data from the video store for supply to the video mixer, the read address being generated in dependence upon the control signal information, wherein the address generator comprises:

an initial address generator for generating the start address of the first frame of a sequence of frames; and an address modifier for incrementing the start address from the initial address generator in proportion to the product of the sequence length and the progress of the video mixer transition to generate the read address.

9. A video storage device for a video mixer, the device comprising:

a video store, for storing video data therein;

control input for receiving control signal information indicating progress of a transition made by the said video mixer between two video compositions; and an address generator for generating a read address for reading video data from the video store for supply to the video mixer, the read address being generated in dependence upon the control signal information, wherein the address modifier generates a read address in accordance with the equation:

Read Address=Start Address+Rounded value of (Transition Position×Clip Length)

wherein the clip length is expressed in frames; the transition position is zero at the start of the transition and one at the end of the transition.

10. A video mixer comprising:

a video storage device comprising:

a video store, for storing video data therein;

control input for receiving control signal information indicating progress of a transition made by the said video mixer between two video compositions;

an address generator for generating a read address for reading video data from the video store for supply to the video mixer, the read address being generated in dependence upon the control signal information;

wherein the address generator comprises:

an initial address generator for generating the start address of the first frame of a sequence of frames; and an address modifier for incrementing the start address from the initial address generator in proportion to the product of the sequence length and the progress of the video mixer transition to generate the read address; and an operator-controlled control actuator for controlling a transition made by the video mixer between two video compositions and the timing of playout of a replayed video signal from the video storage device.

11. A method of video mixing in which a transition is made from a first video signal to a second video signal and in which a third video signal is played out over said transition, the method employing:

a video mixer to form a transition between two the first and second video signals, and a video storage device associated with the video mixer to play out said third video signal in the form of a sequence of frames from the video storage device;

wherein the timing of playout of the third video signal from the video storage device is varied by the repeated reading of frames or parts thereof or by the omission of frames or parts thereof, in dependence upon the progress of the transition made by the said video mixer between the first and second video signals.

12. The method according to claim 11 in which the said transition is controlled by movement of a control actuator that simultaneously controls the said transition and the timing of playout of the third video signal from the said video storage device.

* * * * *